United States Patent

Donini et al.

Patent Number: 5,908,545
Date of Patent: Jun. 1, 1999

[54] ELECTROCHEMICAL PROCESS FOR DECOMPOSING HYDROGEN SULFIDE TO PRODUCE HYDROGEN AND SULFUR

[75] Inventors: John C. Donini, Sherwood Park; Slobodan Petrovic, Toronto; Edward A. Luinstra, Calgary, all of Canada

[73] Assignee: Natural Resources Canada, Ottawa, Canada

[21] Appl. No.: 08/914,177

[22] Filed: Aug. 19, 1997

[51] Int. Cl.[6] .............................. C25C 1/00; C25B 1/02; C01B 17/02
[52] U.S. Cl. ....................... 205/617; 205/637; 423/573.1; 423/576.2
[58] Field of Search ...................... 205/554, 464, 205/617, 637; 423/573.1, 576.2

[56] References Cited

U.S. PATENT DOCUMENTS

| | | | |
|---|---|---|---|
| 3,249,522 | 5/1966 | Bolmer | 204/92 |
| 3,409,520 | 11/1968 | Bolmer | 204/101 |
| 4,765,873 | 8/1988 | Chang et al. | 204/101 |
| 4,772,366 | 9/1988 | Winnick | 204/128 |
| 5,019,227 | 5/1991 | White et al. | 204/128 |
| 5,578,189 | 11/1996 | Joshi | 205/341 |
| 5,705,135 | 1/1998 | Deberry et al. | 423/224 |

*Primary Examiner*—Kathryn Gorgos
*Assistant Examiner*—Edna Wong

[57] ABSTRACT

A process is described for decomposing hydrogen sulfide to produce hydrogen and sulfur. The process comprises mixing hydrogen sulfide with a volatile basic solution and introducing this mixture into an electrolytic cell having an anode and a cathode. By operation of this cell, hydrogen is formed at the cathode and a solution containing polysulfide is formed at the anode. The polysulfide-containing solution is separated and distilled to recover sulfur and the remaining volatile basic solution is recycled to be mixed with further hydrogen sulfide.

11 Claims, 4 Drawing Sheets

ELECTROCHEMICAL PROCESS FOR DECOMPOSING HYDROGEN SULFIDE TO PRODUCE HYDROGEN AND SULFUR

BACKGROUND OF THE INVENTION

This invention relates to an electrochemical process for the decomposition of hydrogen sulfide including the anodic oxidation of sulfides and cathodic reduction and evolution of hydrogen.

The removal of hydrogen sulfide from gaseous streams is a problem that has long challenged many areas of industry. It has been a particular problem in the petroleum industry which produces large quantities of hydrogen sulfide.

Over the years, much research has been directed towards electrolysis of hydrogen sulfide. While many advances have been achieved, significant problems remain in commercializing the process. Typically, electrolysis of liquid hydrogen sulfide suffers from poor conductivity and containment problems. Use of an aqueous medium resolves many issues, but if accompanied by sulfur fouling of the anode, side product formation in strongly alkali medium, and low hydrogen sulfide loading in the acid medium.

Chang et al. U.S. Pat. No. 4,765,873 describes a process for removing hydrogen sulfide from a gaseous stream by contacting the stream with an aqueous solution of ammonium hydroxide to produce ammonium sulfide. This ammonium sulfide is then converted to an ammonium polysulfide intermediate in an electrolytic cell. Thereafter, the ammonium polysulfide is oxidized to sulfur in a heating zone utilizing an oxygen containing gas sparge.

Another method for decomposition and removal of hydrogen sulfide into hydrogen and sulfur is described in Joshi, U.S. Pat. No. 5,578,189. In this process, a gas containing the hydrogen sulfide is contacted with a solid metal ion conducting electrolyte in which the metal is a sulfide forming metal under metal ion conducting conditions to react the metal with hydrogen sulfide under metal sulfiding conditions. A hydrogen sulfide free gas is recovered containing hydrogen and the metal sulfide is electrolytically converted to reform the metal and recover sulfur.

In Winick, U.S. Pat. No. 4,772,366, hydrogen sulfide is removed from a gas mixture by providing an electrochemical cell with a porous cathode and porous anode. This cell is provided with an aqueous electrolyte and a gas mixture containing $H_2S$ is directed into contact with the cathode to cause reduction of the $H_2S$ to polysulfide ions. These polysulfide ions are allowed to migrate from the cathode and concentrate at the anode.

A process involving the electrochemical oxidation of hydrogen sulfide is described in Bolmer, U.S. Pat. No. 3,249,522. That process is specifically developed for the operation of a fuel cell in which the hydrogen sulfide is employed as the fuel. That process uses a sulfur solvent which is vapourizable under process conditions.

It is the object of the present invention to provide an electrolytic process for decomposing hydrogen sulfide in which soluble polysulfide would be produced, thereby avoiding fouling of the anode.

SUMMARY OF THE INVENTION

The present invention relates to a process for decomposing hydrogen sulfide to produce hydrogen and sulfur. The process comprises mixing hydrogen sulfide with a volatile basic solution and introducing this mixture into an electrolytic cell having an anode and a cathode. By operation of this cell, hydrogen is formed at the cathode and a solution containing polysulfide is formed at the anode. The polysulfide-containing solution is separated and distilled to recover sulfur and the remaining volatile basic solution is recycled to be mixed with further hydrogen sulfide.

An important feature of this invention is that no precipitation takes place in the electrochemical cell. Instead, ammonium polysulfides are formed in the ammonia solution. It has surprisingly been found that the ammonium polysulfides are highly soluble in concentrated aqueous ammonia and the $NH_4HS$ that is formed has the advantage of having a high vapour pressure.

Ammonia has been found to be particularly useful as the volatile base because it is cheap, volatile and is capable of forming hydrosulfide solutions with a moderate pH. It has the further advantage that the ammonia does not decompose during electrolysis. Other volatile basic materials that may be used include a variety of substituted amines. Typical of these are methyl, ethyl, propyl or butyl amines which may be mono-, di- or tri-substituted.

The ammonia solutions used in the process of the invention typically contain from about 20 to 80% ammonia, preferably about 50% ammonia. It is also preferred that the ammonia solution be saturated with the hydrogen sulfide.

The ammonium polysulfide solution that is formed in the electrolytic cell may be distilled to boil off ammonia solution leaving behind molten sulfur, or the polysulfide-containing solution may be reacted with an acid with subsequent separation of precipitated sulfur. The distillation is typically conducted at a temperature in the range of about 120 to 130° C.

The electrolytic cell may either be a non-divided (one-compartment) cell or a divided cell. However, best results are obtained in a divided cell.

The typical divided cell comprises an anode in an anolyte compartment and a cathode in a catholyte compartment, with anode and cathode being separated by a membrane. These membranes may be formed from a variety of materials, e.g. Nafion® which are perfluorosulfonic acid cation exchange membranes produced by Dupont. Other suitable membranes include Neosepta® membranes produced by Tokuyama Sode.

BRIEF DESCRIPTION OF THE DRAWINGS

In the accompanying drawings which form a part of the specification and are to be read in conjunction therewith.

DESCRIPTION OF THE PREFERRED EMBODIMENTS

Figure 1:
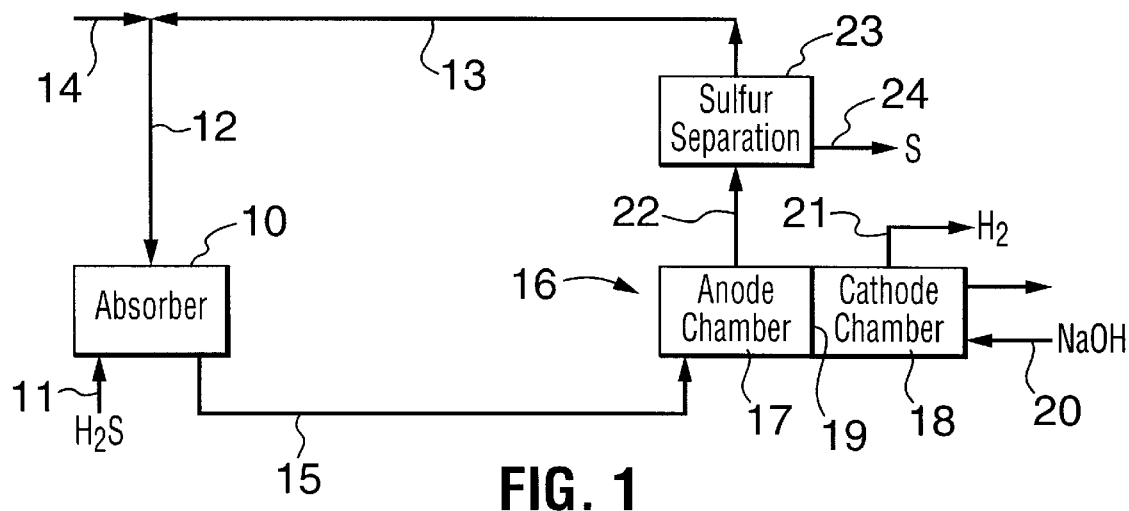
FIG. 1 is a schematic representation of an electrochemical cell of the type which may be utilized to carry out the process of an embodiment of the present invention.

Referring now to FIG. 1, an absorber 10 is coupled with a hydrogen sulfide gas inlet line 11 and an inlet line 12 for a basic volatile solvent stream, e.g. concentrated ammonia 12. In the absorber, the concentrated ammonia solution is saturated with hydrogen sulfide and this mixture is then transferred via line 15 to electrolytic cell 16.

This cell includes an anode compartment 17 and a cathode compartment 18 divided by means of an ion exchange membrane 19. In this cell, the solution from line 15 is the electrolyte in the anode compartment 17 while a stream of sodium hydroxide solution 20 is used as electrolyte in the cathode compartment 18. A stream of hydrogen 21 is generated in the cathode compartment while soluble ammonium polysulfides are formed in the anode compartment. The content of the anode compartment is transferred via line 22 to the distillation unit 23 where the ammonia solution is boiled off via line 13 and molten sulfur is collected via line 24. The ammonia solution 13 is recycled via line 12 to the absorber 10. Make-up ammonia may be added as required by inlet line 14.

A typical electrolytic cell that may be used for the process of this invention is an FM01-LC cell from ICI Chemicals. The cell is operated at a current density of about 0.005 to 10 A per $cm^2$ of electrode area, a temperature of about 20 to 100° C. and a pressure of about 100 to 400 kPa.

EXAMPLE 1

Figure 2:
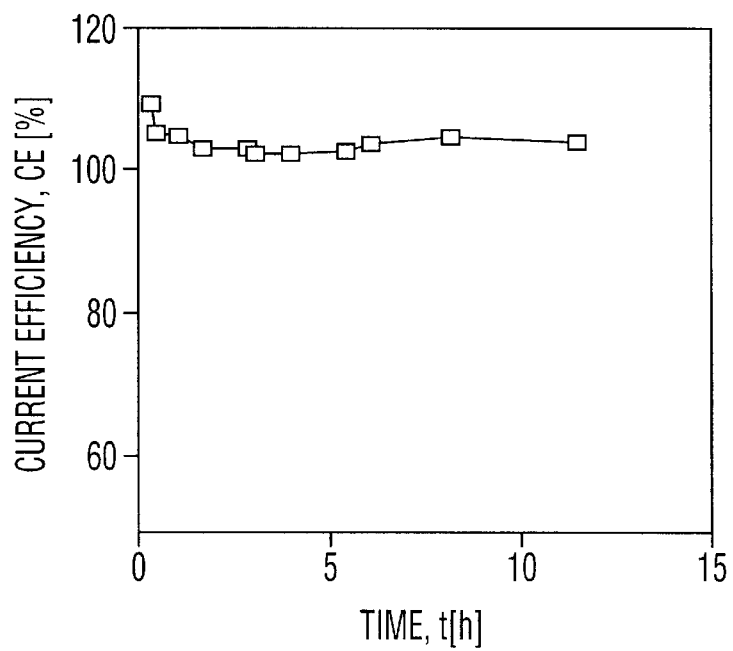
FIG. 2 is a plot of current efficiency v. time.

An electrolysis was carried out using the FM01-LC cell described above. This electrolysis was conducted at ambient temperature using 3 M (21.2%) $NH_4HS$ in the anode compartment, 25% NaOH in the cathode compartment and using Nafion® 324 membrane. A lantern blade nickel cathode and a lantern blade platinized titanium anode were used. The electrode gap was 8 mm. A constant current density was used of 11.7 $mA/cm^2$. As seen from FIG. 2, the hydrogen production efficiencies from the catholyte were high during the entire 11.5 hours that the electrolysis was carried out.

Figure 3:
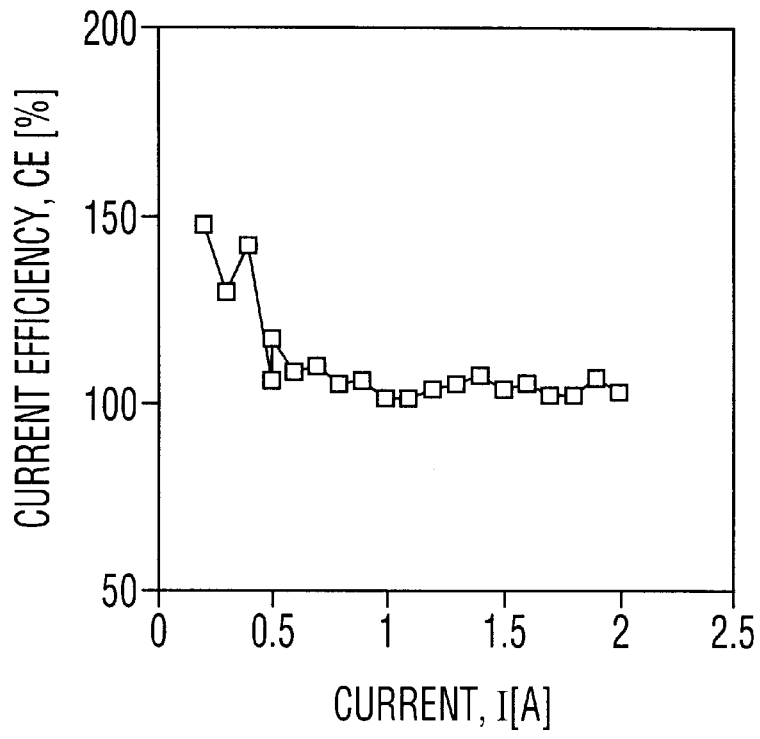
FIG. 3 is a plot of current efficiency v. current.
Figure 4:
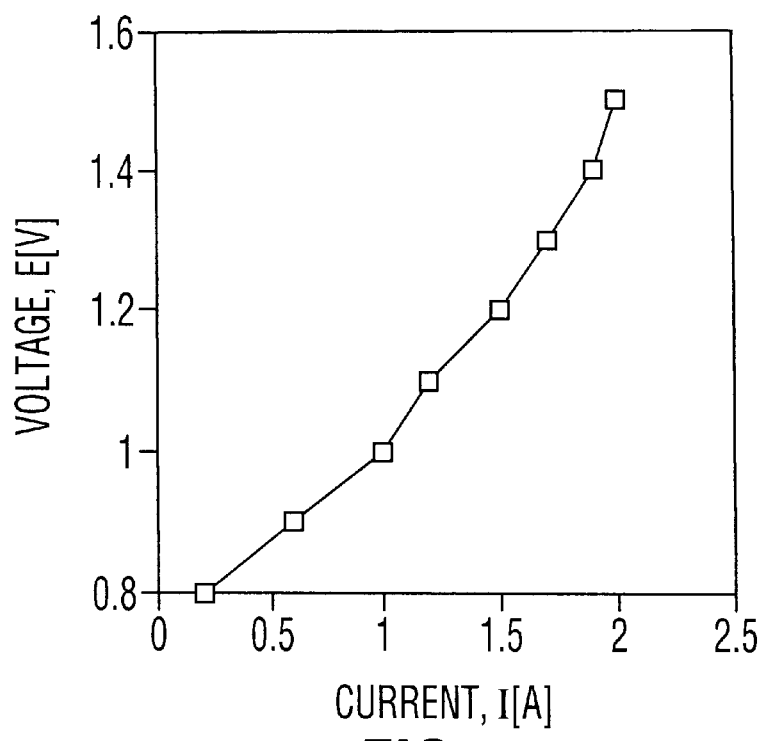
FIG. 4 is a plot showing voltage-current relationships.

Hydrogen production efficiency was then followed as a function of current density. This is one of the most important engineering parameters because it has direct impact on the size of electrodes and, therefore, on capital cost. The current efficiency for hydrogen production was relatively stable in the current range of 0.5 to 2 A as shown in FIG. 3. The same experimental conditions were used as above. Below 0.5 A, ammonia released in the catholyte interfered with the determination of hydrogen production efficiency. The total voltage between electrodes increased with current in a nearly linear fashion as shown in FIG. 4.

EXAMPLE 2

Figure 5:
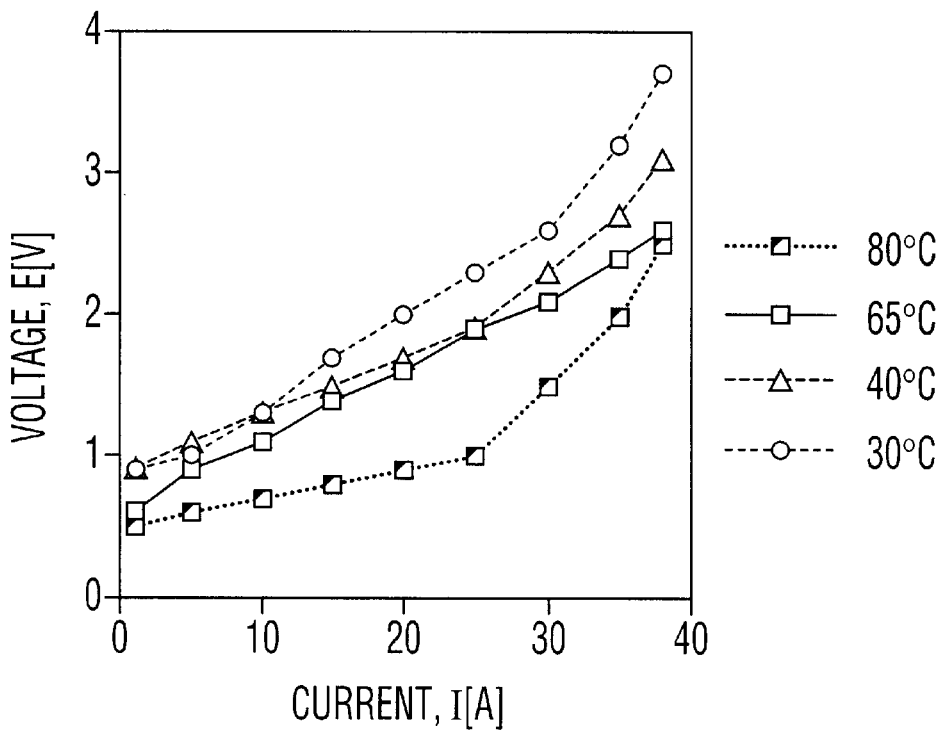
FIG. 5 is a plot showing voltage-current relationships for constant current electrolysis.
Figure 6:
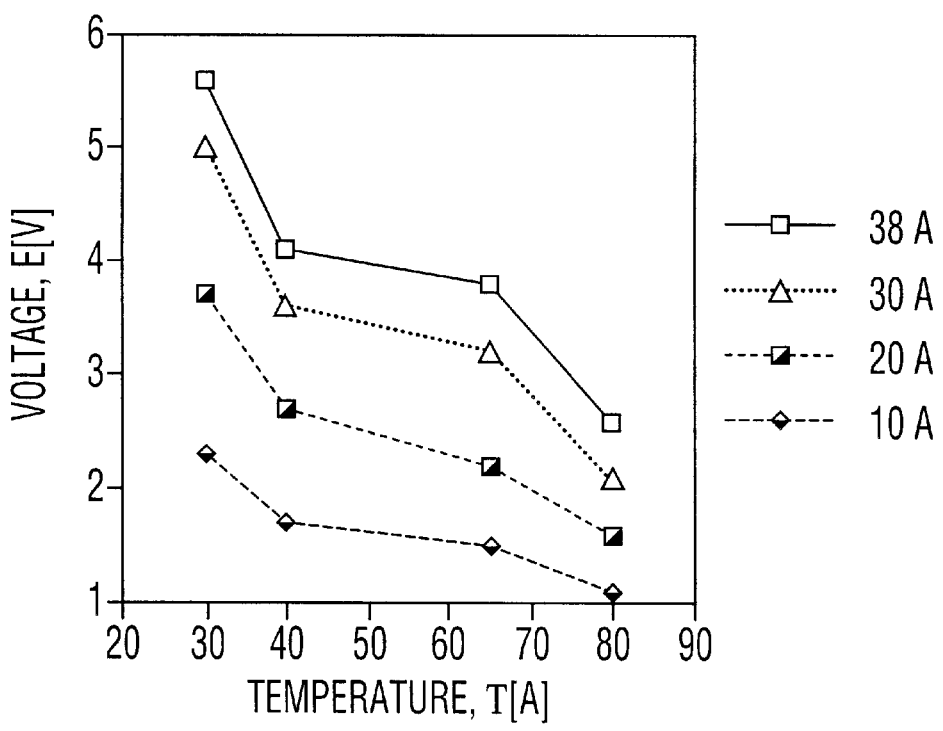
FIG. 6 is a plot of total cell voltage for different currents as a function of temperature.

Using the same cell as in Example 1, an 8 M $NH_4HS$ solution was electrolyzed at a total current of 38 A (148 $mA/cm^2$) for 280 kC over two days and the current-potential curves at several temperatures were obtained for this solution after electrolysis. The test was carried out using a 1.7 mm gap between a lantern blade nickel cathode and a lantern blade platinized titanium anode. The electrode compartments were divided by a Nafion® 324 membrane. It was found that there is a significant decrease in the potential drop across the electrodes with increasing temperature. The higher the current density at the electrodes, the greater is the difference in electrode potentials at different temperatures. The total voltage between electrodes dropped by 0.152 V per °C. of temperature increase. FIG. 5 shows current-voltage curves for four different temperatures. It can be seen that increasing temperature has a positive effect on total cell voltage. The observed behaviour can be explained by both increased reaction rates and increased conductivity of the solution. The cell voltages for different currents were then plotted against temperature in FIG. 6.

EXAMPLE 3

The purpose of this test is to determine long term operation effects. The test was conducted for approximately 200 hours with solutions being changed approximately every 40 hours.

Figure 7:
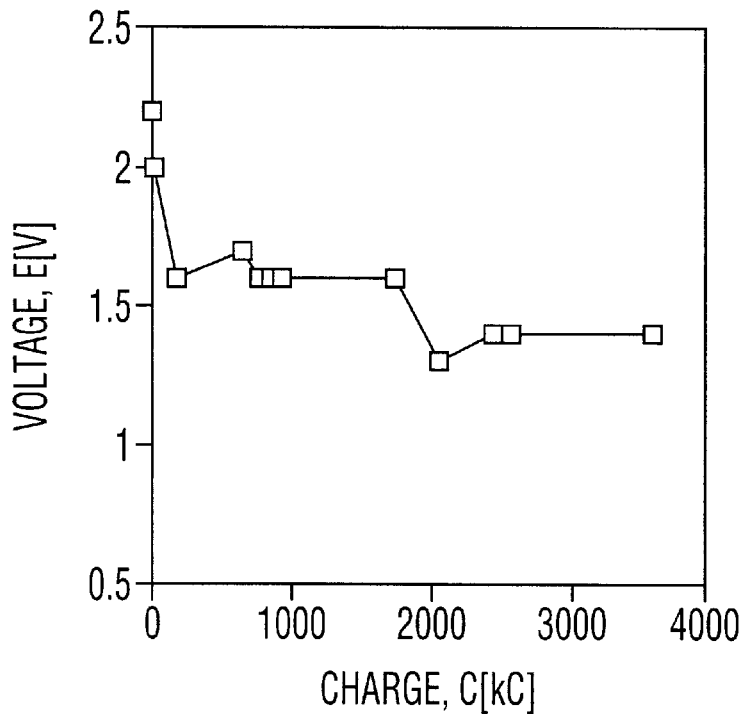
FIG. 7 is a plot of cell voltage as the function of charge.

Electrolysis was performed in the galvanostatic mode, at a constant current of 5 A. The divided cell arrangement was used with a Nafion® 324 membrane separating 8 M $NH_4HS$ in the anodic compartment and 8 M NaOH in the cathodic compartment. Platinized titanium was employed as anode and nickel as the cathode. The experiment was performed at ambient temperature. The voltage change with charge passed is shown in FIG. 7.

Figure 8:
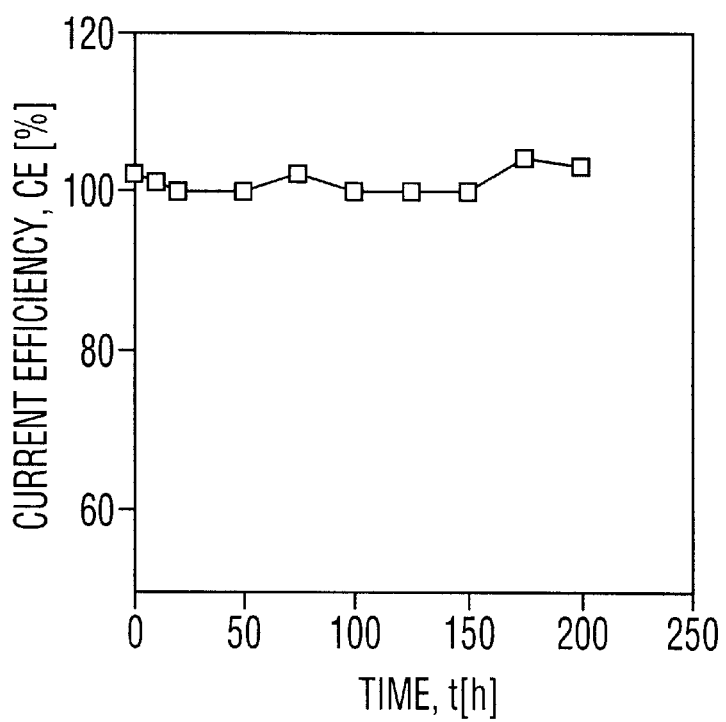
FIG. 8 is a plot of current efficiency for hydrogen production.

It can be seen that the 200 hour electrolysis was very efficient from the energy input point of view. The total voltage of 1.4 V was quite acceptable because it approached the voltages obtained in a glass cell. The electrodes performed well and the membrane did not show any signs of deterioration. The current efficiency for hydrogen production was excellent as shown in FIG. 8.

We claim:

1. A process for decomposing hydrogen sulfide to produce hydrogen and sulfur which comprises mixing hydrogen sulfide with a volatile basic solution, electrolyzing said mixed solution in an electrolytic cell having an anode and a cathode to form hydrogen at the cathode and a solution containing polysulfides at the anode, separating and distillating the polysulfide-containing solution to boil off said volatile basic solution and recover molten sulfur and recycling the boiled off volatile basic solution to be mixed with further hydrogen sulfide, wherein said volatile basic solution is an aqueous solution of ammonia containing about 20–80% ammonia.

2. A process according to claim 1 wherein the aqueous solution of ammonia contains about 50% ammonia.

3. A process according to claim 1 wherein the ammonia solution is saturated with hydrogen sulfide.

4. A process according to claim 1 wherein an ammonium polysulfide solution formed in the electrolytic cell is distilled to boil off ammonium solution leaving molten sulfur.

5. A process according to claim 4 wherein the distillation is conducted at a temperature of about 120–130° C.

6. A process according to claim 1 wherein said electrolytic cell comprising said anode and an anolyte in an anolyte compartment, said cathode and a catholyte in a catholyte compartment, said anode and cathode being separated by a cell membrane.

7. A process according to claim 6 wherein the anolyte is $NH_4HS$ and the catholyte is NaOH.

8. A process according to claim 6 wherein the membrane is a cation conducting membrane.

9. A process according to claim 8 wherein the electrolysis is carried out at a current density of about 0.005 to 10 A per $cm^2$ of electrode area.

10. A process according to claim 9 wherein the electrolysis is carried out at a temperature of about 20 to 100° C. and a pressure of about 100 to 400 kPa.

11. A process according to claim 6 wherein the anode and cathode are formed from transition metal sulfides.

* * * * *